(12) United States Patent
Salem

(10) Patent No.: US 6,414,757 B1
(45) Date of Patent: Jul. 2, 2002

(54) DOCUMENT SECURITY SYSTEM AND METHOD

(75) Inventor: Richard E. Salem, Nepean (CA)

(73) Assignee: Richard Salem, Ottawa (CA)

( * ) Notice: Subject to any disclaimer, the term of this patent is extended or adjusted under 35 U.S.C. 154(b) by 0 days.

(21) Appl. No.: 09/290,175

(22) Filed: Apr. 13, 1999

(51) Int. Cl.[7] .......................... G06K 15/02; H04N 1/40; H04N 1/50; G09C 1/00; B42D 15/00

(52) U.S. Cl. ...................... 358/3.28; 358/3.01; 358/530; 283/902; 283/94; 380/245

(58) Field of Search .......................... 358/1.9, 501, 515, 358/530, 534, 536, 540, 401, 455, 456, 458, 459

(56) References Cited

U.S. PATENT DOCUMENTS

| | | | |
|---|---|---|---|
| 4,176,859 A | 12/1979 | Giordano | 283/8 R |
| 4,513,992 A | 4/1985 | May et al. | 283/94 |
| 4,659,113 A | 4/1987 | Mueller et al. | 283/94 |
| 4,668,597 A | 5/1987 | Merchant | 430/22 |
| 5,018,767 A | 5/1991 | Wicker | 283/67 |
| 5,479,507 A | * 12/1995 | Anderson | 283/902 |
| 5,487,567 A | 1/1996 | Volpe | 283/72 |
| 5,582,103 A | 12/1996 | Tanaka et al. | 101/32 |
| 5,735,547 A | 4/1998 | Morelle et al. | 283/67 |
| 5,788,285 A | 8/1998 | Wicker | 283/93 |

* cited by examiner

Primary Examiner—Scott Rogers
(74) Attorney, Agent, or Firm—Paul S. Sharpe; Marks & Clerk

(57) ABSTRACT

A system and method for secured image creation. A bitmap image is processed to separate color or greyscale planes, or is used as a greyscale, single plane image. The plane(s) are each converted into microtype character layers with each layer arranged at a different angle relative to another layer. The microtype character width is modulated in width based or color or greyscale values and, if multiply colored, the layers are superimposed to form a processed image with anti-counterfeit, anti-scan and anti-copy properties.

16 Claims, 2 Drawing Sheets

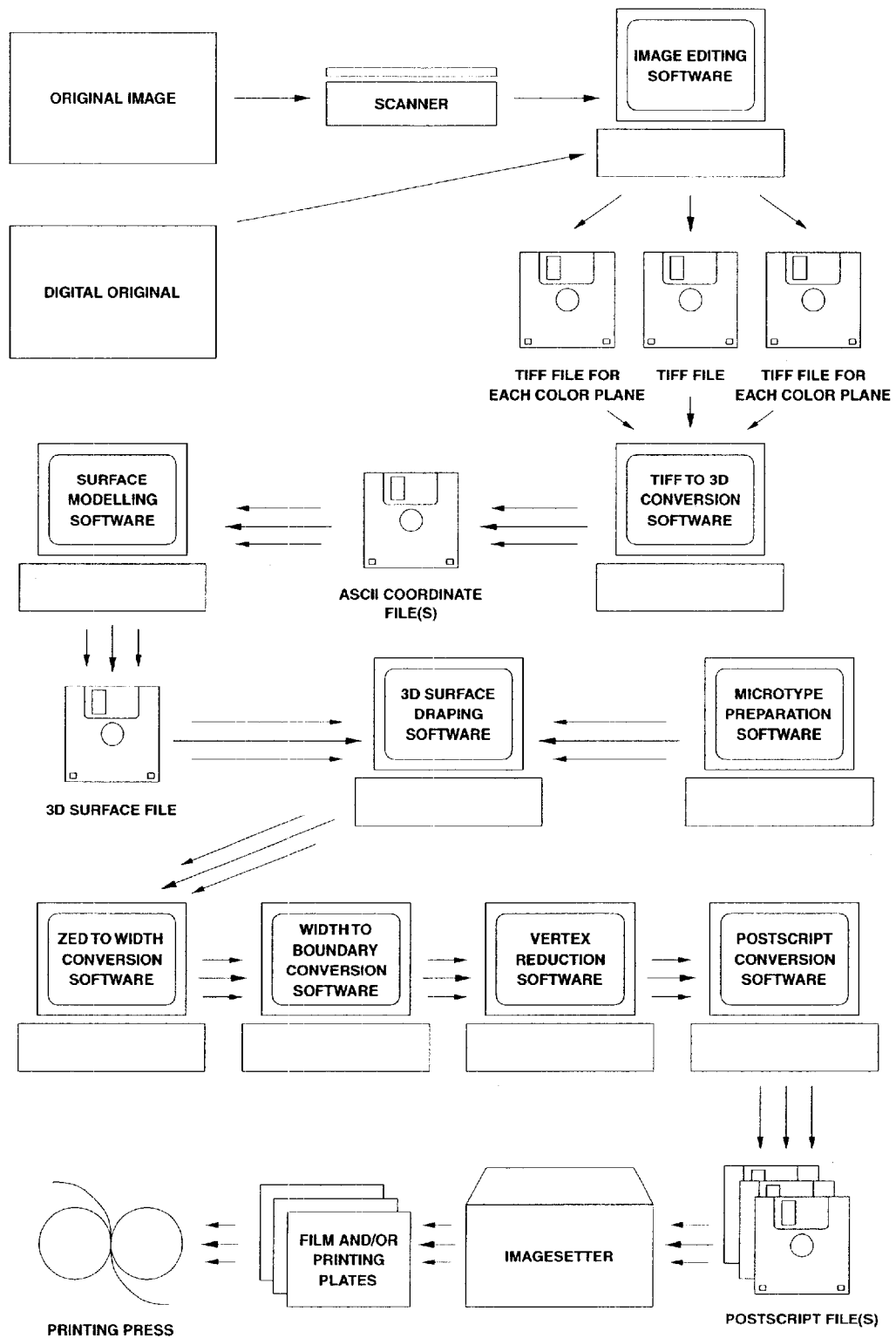
- FIGURE 1. -

DOCUMENT SECURITY SYSTEM AND METHOD

FIELD OF THE INVENTION

The present invention relates to methodology and an apparatus for securing documents and more particularly, the present invention relates to a method and apparatus to prevent falsification of documentation and unauthorized duplication.

BACKGROUND OF THE INVENTION

As is well known, multi-color and single case images in printed matter of which the public is aware are typically composed of dots. Typically, one or several screens of half-tone dots which can be printed in different color inks are superimposed in order to provide the picture. The viewer's visual cortex interprets these small dots into a continuous tone picture. By the combination of dots of different sizes and colors, it is possible to create a picture having the appearance of many more colors than were actually printed. The illusion of up to 16.7 million colors can be generated using only four primary colors.

Lithographic printing uses dot-based half-tone screening in the printing process. For each ink to be printed, a separate printing plate is prepared using a half-tone dot screen that differs from every other screen to be used both in dot angle and pattern. When printed together, the final combined screens form a pattern of dots. There are variations that are known on the patterning, including a complete lack of pattern, referred to as Stochastic screening, but in the majority of the cases, the patterns are dot-based.

Generally, the traditional methods and technology for printing images are far too common place and broadly available to provide protection from counterfeiting or otherwise unauthorized duplication. The traditional secure image does not incorporate dots whatsoever. This is due to the fact that substantially all of the available printing technology is geared to produce and reproduce dot-based material. If secure images do not incorporate dots, they are difficult to reproduce using the prevalent dot-based printing technologies. Accordingly, the typical secure graphic uses line-based screens. In line-based screens, lines are incorporated instead of dots. Density is controlled by varying the thickness and spacing of the lines, thereby changing the ratio of the amount of ink on the paper relative to the white space surrounding it. Localized or fine control over density is a problem because of the continuous line structure. In order to present a photo-like image in a line screen format, the user must be able to change the ratio of ink to white space at a given point on the line and not along its complete length.

There exists a need for a system whereby single and multiple color planed images may be generated which do not use dots and with the result being a high fidelity image that has anti-counterfeit, anti-scan and anti-copy properties.

SUMMARY OF THE INVENTION

One object of one embodiment of the present invention is to provide a method of processing a bitmap image to form an image which has anti-counterfeit, anti-scan and anti-copy properties, comprising:

providing a bitmap image having color or greyscale planes, each plane of which has color or greyscale values;

processing the bitmap image to separate each color or greyscale plane of the color or greyscale planes;

converting image material of each color or greyscale plane into microtype layers having characters, each layer having microtype arranged at a different angle;

modulating character width in each layer based on the color or greyscale values from the bitmap image; and superimposing the layers of characters to produce a processed image of the bitmap image, whereby the processed image has anti-counterfeit, anti-scan and anti-copy properties.

A further object of one embodiment of the present invention is to provide a method of processing a bitmap image to form an image which has anti-counterfeit, anti-scan and anti-copy properties, comprising:

providing a bitmap image having color or greyscale values;

editing the bitmap image to form a separate TIFF color or greyscale plane for each color or greyscale of the bitmap image;

processing each color or greyscale plane into coordinates of position represented by an X value and a Y value and a Z value representative of a sum of color or greyscale value;

converting the coordinates into a virtual three dimensional surface;

forming a microtype vector outline template for each color or greyscale plane;

varying angular disposition of the microtype within each color or greyscale plane;

applying microtype to the virtual surface;

converting each Z value into a line width value;

processing the line width value into a polygonal vector outline; and imaging vectors with a high resolution imaging device.

A still further object of one embodiment of the present invention is to provide a system for processing a bitmap image to a secured image which has anti-counterfeit, anti-scan and anti-copy properties, comprising:

bitmap image editing means for editing the bitmap image, the bitmap image having color or greyscale values;

a processor for processing the bitmap image to separate each color or greyscale plane of the color or greyscale planes;

pixel conversion means for converting pixels in each color or greyscale plane into Cartesian coordinates with an X value and a Y value representative of position and a Z value representative of color or greyscale value;

computer aided design software for processing the coordinates of each color or greyscale plane into a virtual three dimensional surface;

a conversion processor for converting each Z value into a width dimension; and postscript translation means for translating the coordinates into an image which has anti-counterfeit, anti-scan and anti-copy properties.

The microtype may be selected from any suitable type with the bitmap image being captured as a variable width modulation of the character outlines in the composite microtype screens. The effect of this for multicolor images is that when the screens are superimposed, the viewer perceives a multiple color, image. For greyscale images, the viewer perceives the monochromatic image. Advantageously, the process prevents counterfeiting and unauthorized reproduction in a number of ways including photomechanical reproduction, color copying, as well as high and low resolution scanning. Considering the fact that each color or greyscale plane contains an infinite range of graduation in tone, the subtlety of tone range achieved in the digital master image can not be accurately photographed or scanned. Loss of the fine tonal variations is almost impossible to avoid. Any copied image will lack the vibrancy of the original and this becomes extremely evident in a comparison of the original image to a copied image. In addition, reverse engineering and/or image reconstruction are impossible.

As an added benefit, each character in the microtype and, as will be appreciated, there can be several hundreds of thousands of characters in a single image, is completely unique. By practicing a methodology of the present invention, no two characters on the entire image and all of its color planes are the same. Even if a counterfeiter were equipped with the original digital subject image, the digital microtype character templates and the software involved in effecting the present invention, an exact match could not be generated.

Having thus described the invention, reference will now be made to the accompanying drawings illustrating preferred embodiments.

BRIEF DESCRIPTION OF THE DRAWINGS

FIG. 1 is a schematic flow chart illustrating the components employed in the system and sequence of events.

Similar numerals in the figures denote similar elements.

DETAILED DESCRIPTION OF THE PREFERRED EMBODIMENTS

Figure 2A:
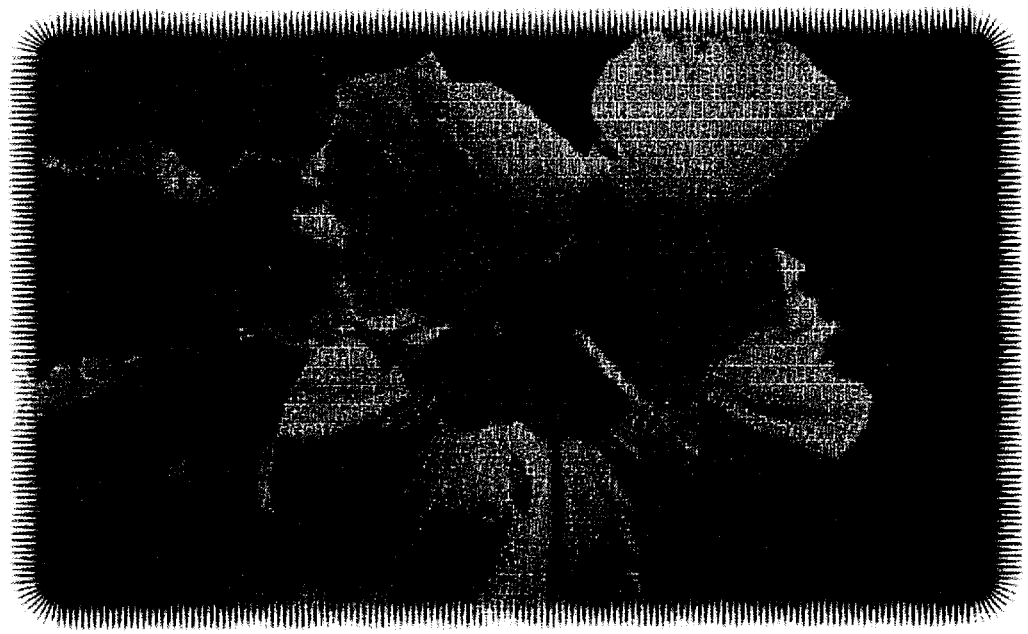
FIGS. 2a through 2e illustrate isolated planes of an image processed according to the methodology of the present invention.
Figure 2B:
Figure 2C:
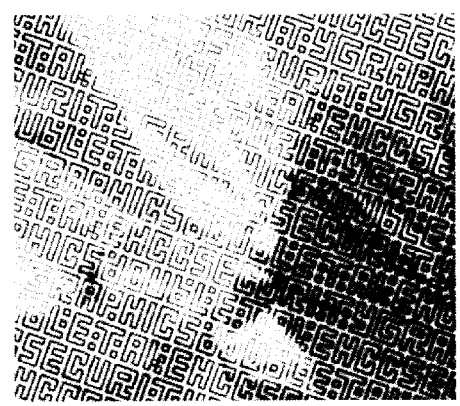
Figure 2D:
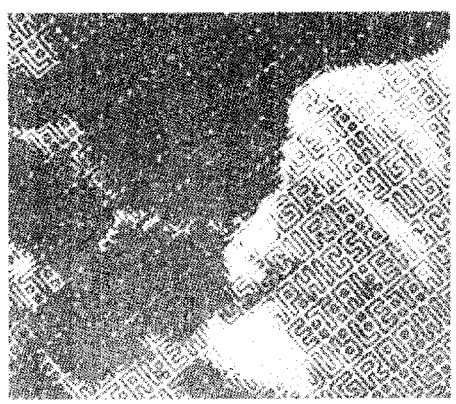
Figure 2E:
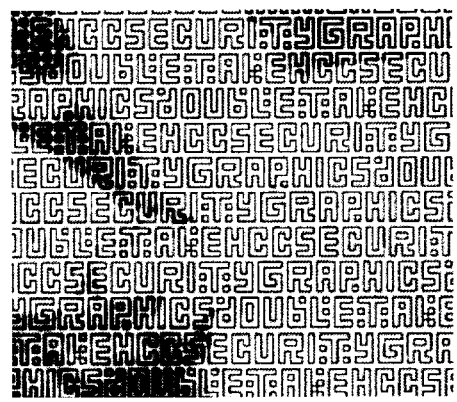

In accordance with the present invention and with reference to FIG. 1, one or more bitmap images are provided, either by scanning with a scanner or digital capture. The file may be temporarily stored in a hard disk or a floppy disk format. Depending upon the requirements of the user, the image may be edited and composited using commercial editing software. Typical of this type of software is Adobe PhotoShop™. If the image is to be printed in a multiple color format, then it first must be color separated and a separate TIFF file of each color plane created. If the image is to be printed in one color, a single TIFF file is prepared. Multiple color images are typically separated along duo-tone, tri-tone or four-color-process color planes.

Each TIFF color plane file is processed through a module. The module contains a program which takes the array of pixels in the bitmap TIFF format and converts the pixels into Cartesian coordinate triplets. The pixel's position in the image becomes the X and Y value, and the sum of the red, green, blue (RGB) color value, becomes the Z. In greyscale images, the Z value is the greyscale value. The module comprises a module T3D and runs a program Tiff to 3D.

The coordinate files are brought into AutoCAD using a 3D surface modeling program from Schreiber Instruments called QuickSurf™. The surfaces are scaled and positioned using QuickSurf's™ ASCII coordinate import feature. The CAD program AutoCad is useful to create microtype vector outline templates using polylines. A template is created for each color or greyscale plane and the plane oriented at a different angle from its other plane. The character outlines are specifically engineered to interfere with effective scanning with the center lines of the character sides created a specific distance apart. In order to determine the distance, the common problem frequency and density among all of the colors is tested, and that which poses the greatest degree of difficulty in copying, is selected. Once this process is complete, the microtype character outlines are draped onto the modeling surface indicated above using QuickSurf's™ Drape function.

A further module then converts the Z value, which was previously encoded into a 3D polyline vertex, into a 2D polyline width at the same XY coordinate for each vertex. In essence, the XY value is retained, and the Z value is converted to width. The module that converts the Z value includes VLW3D (Variable Line Width from 3D) processing capability.

A further module converts the center-defined polyline width into outline- or region-defined polygonal boundaries which are then reduced to essential vertices only using commercial weeding programs. Once such brand is TCI's CuveFit and Jerry Workman's Vector. These may be used singly or in combination. The vector files are then converted to PostScript using AutoScript, an AutoCAD DXF to the PostScript translator. The PostScript files are imaged to film at as high a resolution as possible. Most desirably, the Agfa Avantra digital imagesetter with a Star RIP at 3600 dpi is employed. The PostScript files can also be imaged directly to printing plates for offset printing applications.

The module that converts the center-line polyline width to polygonal boundary incorporates POUT and involves polyline to outline processing for producing defined outer edges.

The most effective arrangement, which takes full advantage of the process, is realized in multiple color plane applications. The color planes adds a depth and richness of detail that has not been achievable by prior art techniques. Multiple color planes contribute to the security of the image. The counterfeiter must first separate the color planes from one another before they can be counterfeited.

Using the technology according to the present invention, the images are built with colors that are difficult to separate photographically or digitally. In this manner, semi-translucent inks create new colors were character outlines cross one another, making separation even more difficult. Typically, colors that are most useful are those that are outside the range of reproduction for color process printing methods thus rendering this counterfeiting approach futile.

As an example, FIG. 2a illustrates an image processed according to the methodology of the present invention. The image of FIG. 2a is shown in isolated planes in FIGS. 2b through 2e. As illustrated, the microtype in each plane is presented at a different angle in each plane; 20° in FIG. 2b, 340° in FIG. 2c; 40° in FIG. 2d and 0° in FIG. 2e. The microtype character variation in width is also evident between Figures; when the images in FIGS. 2b through 2e are superimposed, the result is FIG. 2a.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method of processing a bitmap image to form an image which has anti-counterfeit, anti-scan and anti-copy properties, comprising:

providing a bitmap image having color or greyscale planes, each plane of which has color or greyscale values;

processing said bitmap image to separate each color or greyscale plane of said color or greyscale planes;

converting image material of each said color or greyscale plane into microtype layers having characters, each layer having microtype arranged at a different angle;

modulating character width in each said layer based on said color or greyscale values from said bitmap image; and, for multi-color printing applications superimposing said layers of characters to produce a processed image of said bitmap image, whereby said processed image has anti-counterfeit, anti-scan and anti-copy properties.

2. The method as set forth in claim 1, further including the step of converting said processed image to printing plates for offset printing.

3. The method as set forth in claim 1, wherein modulating said character width includes varying spacing between said microtype within a color or greyscale plane by varying microtype character width.

4. The method as set forth in claim 3, further including the step of varying color or greyscale tone of said microtype in a respective color or greyscale plane.

5. The method as set forth in claim 1, wherein each character in said microtype of each said color or greyscale plane is dissimilar from any other character in said processed image.

6. The method as set forth in claim 1, wherein said bitmap image is monochromatic.

7. The method as set forth in claim 1, wherein said bitmap image is polychromatic.

8. A method of processing a bitmap image to form an image which has anti-counterfeit, anti-scan and anti-copy properties, comprising:

providing a bitmap image having color or greyscale values;

editing said bitmap image to form a separate TIFF color or greyscale plane for each color or greyscale of said bitmap image;

processing each said color or greyscale plane into coordinates of position represented by an X value and a Y value and a Z value representative of a sum of color or greyscale value;

converting said coordinates into a virtual three dimensional surface;

forming a microtype vector template for each said color or greyscale plane;

varying angular disposition of said microtype within each said color or greyscale plane;

applying microtype to the virtual surface;

converting each said Z value into a line width value;

processing said line width value into a vector outline;

and imaging vectors with a high resolution imaging device.

9. The method as set forth in claim 8, further including the step of converting said processed image to printing plates for offset printing.

10. The method as set forth in claim 8, wherein modulating said character width includes varying spacing between said microtype within a color or greyscale plane by varying microtype character width.

11. The method as set forth in claim 10, further including the step of varying color or greyscale tone of said microtype in a respective color or greyscale plane.

12. The method as set forth in claim 8, wherein each character in said microtype of each said color or greyscale plane is dissimilar from any other character in said processed image.

13. The method as set forth in claim 8, wherein said bitmap image is monochromatic.

14. The method as set forth in claim 8, wherein said bitmap image is polychromatic.

15. A system for processing a bitmap image to a secured image which has anti-counterfeit, anti-scan and anti-copy properties, comprising:

bitmap image editing means for editing said bitmap image, said bitmap image having color or greyscale values;

a processor for processing said bitmap image to separate each color or greyscale plane of said color or greyscale planes;

pixel conversion means for converting pixels in each said color or greyscale plane into Cartesian coordinates with an X value and a Y value representative of position and a Z value representative of color or greyscale value;

computer aided design software for processing said coordinates of each color or greyscale plane into a virtual three dimensional surface;

a surface processing software program for molding two dimensional vector data onto the virtual surface;

a conversion processor for converting each said Z value into a width dimension; and translation means for translating said coordinates into an image which cannot be copied.

16. The system as set forth in claim 15, further including high resolution imaging means.

* * * * *